United States Patent
Nagashima

(10) Patent No.: US 10,565,913 B2
(45) Date of Patent: Feb. 18, 2020

(54) IMAGE DISPLAY APPARATUS AND CONTROL METHOD THEREOF

(71) Applicant: CANON KABUSHIKI KAISHA, Tokyo (JP)

(72) Inventor: Yoshiyuki Nagashima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 594 days.

(21) Appl. No.: 15/070,731

(22) Filed: Mar. 15, 2016

(65) Prior Publication Data

US 2016/0275913 A1  Sep. 22, 2016

(30) Foreign Application Priority Data

Mar. 17, 2015  (JP) .................................. 2015-053524

(51) Int. Cl.
G09G 3/20 (2006.01)
G06T 5/00 (2006.01)

(52) U.S. Cl.
CPC ............... *G09G 3/20* (2013.01); *G06T 5/009* (2013.01); *G09G 2320/0276* (2013.01)

(58) Field of Classification Search
CPC ............................................. G09G 2320/0271
See application file for complete search history.

(56) References Cited

U.S. PATENT DOCUMENTS

| | | | |
|---|---|---|---|
| 10,097,786 B2 | 10/2018 | Terada et al. | |
| 2008/0122953 A1* | 5/2008 | Wakahara | G06T 5/10 348/241 |
| 2014/0218416 A1* | 8/2014 | Suzuki | G09G 5/10 345/690 |

FOREIGN PATENT DOCUMENTS

| | | |
|---|---|---|
| JP | 2004-220438 A | 8/2004 |
| JP | 2006-333113 A | 12/2006 |
| WO | 2013/140958 A1 | 9/2013 |
| WO | 2015/198552 A1 | 12/2015 |

OTHER PUBLICATIONS

The above foreign patent documents were cited in the Jan. 8, 2019 Japanese Office Action, which is enclosed without an English Translation, that issued in Japanese Patent Application No. 2015-053524.

* cited by examiner

*Primary Examiner* — Robin J Mishler

(74) *Attorney, Agent, or Firm* — Cowan, Liebowitz & Latman, P.C.

(57) ABSTRACT

An image display apparatus includes a first acquiring unit configured to acquire first range information representing a first range for input image, a second acquiring unit configured to acquire second range information representing a second range for image display, a processing unit configured to generate processed image from the input image by image processing based on the first and second range information, and a display unit configured to display the processed image. By the image processing, a characteristic closer to a gradation characteristic of the input image is acquired as a gradation characteristic of the processed image in the second range, compared with a range outside the second range, within a range of brightness-related values of the input image.

14 Claims, 9 Drawing Sheets

FIG. 7

| REFLECTANCE [%] | BRIGHTNESS [cd/m²] |
|---|---|
| 0 | 0.1 |
| 100 | 100 |
| 200 | 200 |
| 300 | 300 |
| 400 | 400 |
| 500 | 500 |
| 600 | 600 |
| 700 | 700 |
| 800 | 800 |
| 900 | 900 |
| 100 | 1000 |

IMAGE DISPLAY APPARATUS AND CONTROL METHOD THEREOF

BACKGROUND OF THE INVENTION

Field of the Invention

The present invention relates to an image display apparatus and a control method thereof.

Description of the Related Art

Recently as the light receiving performance of imaging apparatuses improve, photographed image data having a wider dynamic range than BT. 709, which is normally used for video gamma, has begun to be generated. Hereafter image data having a wide dynamic range is referred to as "high dynamic range (HDR) image data". For example, Cineon Log, determined based on the characteristics of films having a wide dynamic range, is used as a data format of HDR image data. In the workflow of image creation, HDR image data, which is photographed image data, is displayed on an image display apparatus during photographing, and the signal level confirmation and color adjustment are performed for the imaging apparatus based on the display result.

In an image display apparatus, on the other hand, a displayable dynamic range (display range) may be limited to a dynamic range narrower than the dynamic range of an imaging apparatus (photographing range) in some cases, considering an increase in power consumption, drop in reliability caused by component heating and the like. In this case, image data of which dynamic range is wider than the display range is displayed after image processing to narrow the dynamic range to the display range (compression processing) is performed. If compression processing is performed on image data, general brightness of the display image (image displayed on screen) drops, and visibility of the display image deteriorates.

Prior arts related to the compression processing are disclosed, for example, in Japanese Patent Application Laid-Open No. 2004-220438 and Japanese Patent Application Laid-Open No. 2006-333113. According to the technique disclosed in Japanese Patent Application Laid-Open No. 2004-220438, the gradation width in a high brightness region in the image is compressed by the compression processing. According to the technique disclosed in Japanese Patent Application Laid-Open No. 2006-333113, a plurality of image data, of which degree of compression is different from each other, is created by performing a plurality of types of compression processing, of which control parameters related to the contrast and dynamic range are different from each other, on the image data. Then the generated plurality of image data is simultaneously displayed on one screen.

However, in the case of the technique disclosed in Japanese Patent Application Laid-Open No. 2004-220438, a difference is generated in the gradation characteristics between a high brightness region and the other image regions. In the case of the technique disclosed in Japanese Patent Application Laid-Open No. 2006-333113, a plurality of image data is simultaneously displayed on one screen, hence the image data cannot be displayed dot by dot. In other words, image quality deteriorates.

When the signal level confirmation and color adjustment are performed for an imaging apparatus based on the display result (display image) during photographing, it is preferable to display image data in which the gradation characteristics of the photographed image data are accurately reproduced. If the focus of the imaging apparatus is also confirmed at the same time, then it is preferable to display the image data dot by dot. In other words, it is preferable that the deterioration of the image quality is minimal (or not generated). This means that it is not desirable to use the techniques disclosed in Japanese Patent Application Laid-Open No. 2004-220438 and Japanese Patent Application Laid-Open No. 2006-333113 to confirm a photographed image data.

SUMMARY OF THE INVENTION

The present invention provides a technique which suppresses a change in gradation characteristics and deterioration of image quality, and allows acquiring display images with high visibility.

The present invention in its first aspect provides an image display apparatus comprising:

a first acquiring unit configured to acquire first range information representing a first range, which is a range of brightness-related values for input image data;

a second acquiring unit configured to acquire second range information representing a second range, which is a range of brightness-related values for image display, and is a range narrower than the first range;

a processing unit configured to generate processed image data by performing, on the input image data, image processing to narrow the range of the brightness-related values for the image data from the first range to the second range, based on the first range information and the second range information; and a display unit configured to display an image based on the processed image data, wherein the image processing is processing to change each gradation value of the input image data, so that a characteristic closer to a gradation characteristic of the input image data is acquired as a gradation characteristic of the processed image data in the second range, compared with a range outside the second range, within the range of the brightness-related values of the input image data.

The present invention in its second aspect provides a control method of an image display apparatus, comprising:

a first acquiring step of acquiring first range information representing a first range, which is a range of brightness-related values for input image data;

a second acquiring step of acquiring second range information representing a second range, which is a range of brightness-related values for image display, and is a range narrower than the first range;

a processing step of generating processed image data by performing, on the input image data, image processing to narrow the range of the brightness-related values for the image data from the first range to the second range, based on the first range information and the second range information; and a display step of displaying an image based on the processed image data, wherein the image processing is processing to change each gradation value of the input image data, so that a characteristic closer to a gradation characteristic of the input image data is acquired as a gradation characteristic of the processed image data in the second range, compared with a range outside the second range, within the range of the brightness-related values of the input image data.

The present invention in its third aspect provides an image display apparatus comprising:

a first acquiring unit configured to acquire first range information related to a dynamic range of input image data;

a second acquiring unit configured to acquire second range information related to a dynamic range of a display unit;

a processing unit configured to generate processed image data by performing image processing to convert each gradation value of the input image data, based on the first range information and the second range information; and the display unit configured to display an image based on the processed image data, wherein in the image processing, a first inclination representing correspondence between an input gradation value and an output gradation value in a second range corresponding to the second range information is greater than a second inclination representing correspondence between an input gradation value and an output gradation value in a range that is within a first range corresponding to the first range information and outside the second range.

The present invention in its fourth aspect provides a control method of an image display apparatus, comprising:

a first acquiring step of acquiring first range information related to a dynamic range of input image data;

a second acquiring step of acquiring second range information related to a dynamic range of a display;

a processing step of generating processed image data by performing image processing to convert each gradation value of the input image data, based on the first range information and the second range information; and a display step of displaying an image based on the processed image data, wherein in the image processing, a first inclination representing correspondence between an input gradation value and an output gradation value in a second range corresponding to the second range information is greater than a second inclination representing correspondence between an input gradation value and an output gradation value in a range that is within a first range corresponding to the first range information and outside the second range.

According to the present invention, a change in gradation characteristics and deterioration of image quality can be suppressed, and display images with high visibility can be acquired.

Further features of the present invention will become apparent from the following description of exemplary embodiments with reference to the attached drawings.

BRIEF DESCRIPTION OF THE DRAWINGS

FIG. 7 is a table showing an example of brightness information according to Example 2;

DESCRIPTION OF THE EMBODIMENTS

Example 1

An image display apparatus according to Example 1 of the present invention and a control method thereof will be described. The present invention can be applied to any image display apparatus. For example, the present invention can be applied to a liquid crystal display apparatus, an organic EL display apparatus, a plasma display apparatus and the like. In Example 1, a case when image data to be input to the image display apparatus (input image data) is image data acquired by photographing using an imaging apparatus (photographed image data) will be described, but the input image data is not limited to photographed image data. For example, the input image data may be graphic image data that represents a graphic image.

Figure 1:
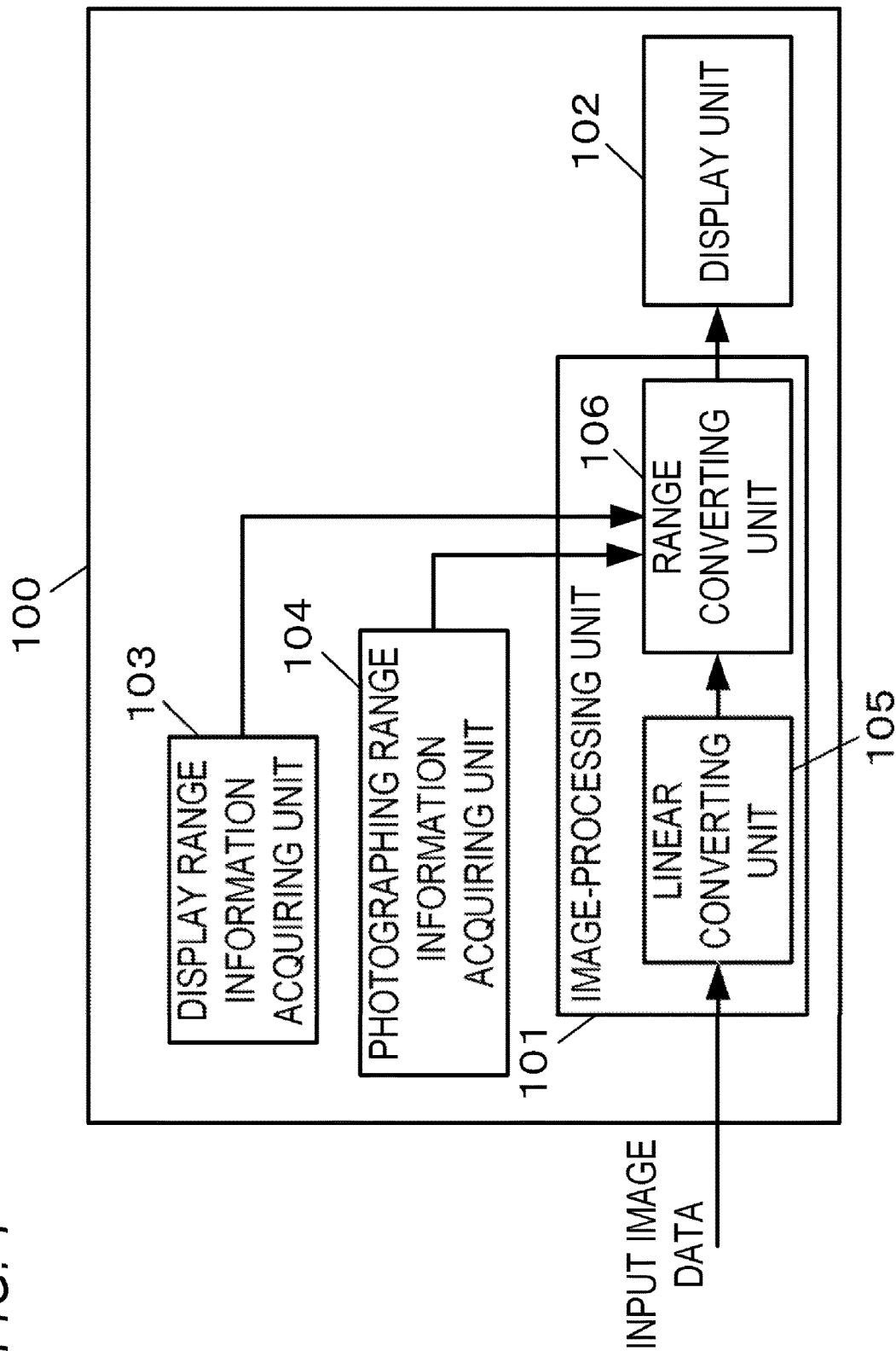
FIG. 1 is a block diagram depicting an example of a configuration of an image display apparatus according to Example 1.

FIG. 1 is a block diagram depicting an example of a configuration of the image display apparatus 100 according to Example 1. As shown in FIG. 1, the image display apparatus 100 includes an image-processing unit 101, a display unit 102, a display range information acquiring unit 103, and a photographing range information acquiring unit 104.

The photographing range information acquiring unit 104 acquires the photographing range information (first range information) representing the photographing range (first acquiring processing). The photographing range is a dynamic range of the input image data. In concrete terms, the photographing range is a range of the brightness-related values for the input image data (first range). The photographing range can also be defined as "a range of brightness-related values that are expected in the input image data". The photographing range information acquiring unit 104 outputs the acquired photographing range information to the image-processing unit 101.

Here for the operation mode of the image display apparatus 100, one of a plurality of operation modes (input modes), which correspond to a plurality of photographing ranges respectively, can be set. In this case, the photographing range information acquiring unit 104 can acquire the photographing range information corresponding to the input mode that is set. For example, the photographing range information acquiring unit 104 can generate the photographing range information to represent a photographing range corresponding to the input mode that is set. The image display apparatus 100 may store a plurality of photographing range information in advance corresponding to a plurality of input modes respectively. In this case, the photographing range information acquiring unit 104 can acquire photographing range information corresponding to the input mode that is set, from the plurality of photographing range information provided in advance.

If the input image data is photographed image data, the imaging apparatus normally stores the photographing range information thereof. Therefore in this case, the photographing range information acquiring unit 104 can acquire the photographing range information from the imaging apparatus. Further, in some cases the photographing range information is included in the input image data. For example, the photographing range information may be included in the metadata of the input image data. In this case, the photographing range information acquiring unit 104 can acquire (extract) the photographing range information from the input image data.

The brightness-related value is a value related to brightness. As a format to represent brightness, reflectance when light is reflected by an object may be used. In Example 1, a case when the brightness-related value is reflectance will be described. Brightness of an object illuminated under ambient light is often represented by 0 to 100% reflectance, and brightness of a light source (e.g. illumination apparatus, sun) having brightness exceeding the above is often represented by a 100% or higher reflectance. In Example 1, it is assumed that the reflectance for the input image data is 0 to 1000%, and the signal level (gradation value) of the input image data is a 10-bit value (0 to 1023).

The brightness-related value can be any value related to brightness, and is not limited to reflectance. For example, the brightness-related value may be the brightness (brightness value) itself, or may be the quantity of light (light quantity) that entered the image sensor of the imaging apparatus. The range of the reflectance for the input image data, and the range of the gradation value of the input image data, may be narrower or wider than the above mentioned range.

The display range information acquiring unit 103 acquires the display range information (second range information) representing the display range (second acquiring processing). The display range is the dynamic range of the image data used by the display unit 102. In other words, the display range is a range of reflectance used when an image is displayed (second range). The display range can also be defined as "a range of reflectance that is expected when an image is displayed". In Example 1, it is assumed that the display range is narrower than the photographing range (1000%). In concrete terms, it is assumed that the display range is a part of the photographing range. Further, it is assumed that when an image is displayed, the reflectance outside the display range is limited to a reflectance within the display range. The display range information acquiring unit 103 outputs the acquired display range information to the image-processing unit 101.

Here it is assumed that any one of a plurality of operation modes (display modes) corresponding to a plurality of display ranges can be set as an operation mode of the image display apparatus 100. In this case, the display range information acquiring unit 103 can acquire the display range information corresponding to the display mode that is set. For example, if a display mode corresponding to BT. 709 is set, the display range information acquiring unit 103 acquires the display range information of which display range (range of reflectance) is 0 to 100%. If a display mode corresponding to image data of which dynamic range is wider than BT. 709 is set, the display range information acquiring unit 103 acquires display range information of which display range is wider than the 0 to 100% range according to the display mode. A wide dynamic range (e.g. dynamic range wider than BT. 709) can be called "high dynamic range (HDR)". The image data of which dynamic range is wide can be called "HDR image data".

The display range information acquiring unit 103 may acquire the display range information representing a predetermined display range, regardless the display mode. For example, the display range information representing the maximum range of the reflectance that can be used when an image is displayed may always be used. In other words, the display range information representing the maximum range of the reflectance that can be expected when an image is displayed may always be used. The display range represented by the display range information can be any value if it is narrower than the maximum range. Reflectance outside the photographing range may be included in the display range.

The image-processing unit 101 performs range conversion processing (first image processing) on the input image data based on the photographing range information output from the photographing range information acquiring unit 104 and the display range information output from the display range information acquiring unit 103 (first processing). Thereby the display image data (first processed image data) is generated. The range conversion processing is processing to change each gradation value of the input image data, and processing to narrow the dynamic range of the image data from the photographing range to the display range. According to Example 1, by the range conversion processing, a characteristic closer to the gradation characteristic of the input image data is acquired as the gradation characteristic of the display image data within the display range, compared with a range outside the display range, within the range of the reflectance of the input image data. The image-processing unit 101 outputs the generated display image data to the display unit 102. In Example 1, it is assumed that the gradation value of the display image data is a 10-bit value (0 to 1023), just like input image data.

The image processing performing on the input image data is not limited to the range conversion processing. A plurality of types of image processing, including the range conversion processing, may be performed on the input image data. For the image processing other than the range conversion processing, blur processing, edge enhancement processing and the like can be used. The range of the gradation value of the display image data may be narrower or wider than the above mentioned range. The range of the gradation value of the display image data may be narrower or wider than the range of the gradation value of the input image data.

The display unit 102 displays an image based on the display image data output from the image-processing unit 101. For example, the display unit 102 has a plurality of display elements, and drives each display element using a drive signal corresponding to the gradation value of the display image data. Thereby the image is displayed. The value of the drive signal may or may not be a value that is uniquely determined with respect to the gradation value of the display image data. For example, the value of the drive signal may be a value that changes depending on the display range (display mode). For the display element, a liquid crystal element, an organic EL element, a plasma element or the like can be used.

The image-processing unit 101 will be described in detail. As shown in FIG. 1, the image-processing unit 101 has a linear converting unit 105 and a range converting unit 106.

Figure 2:
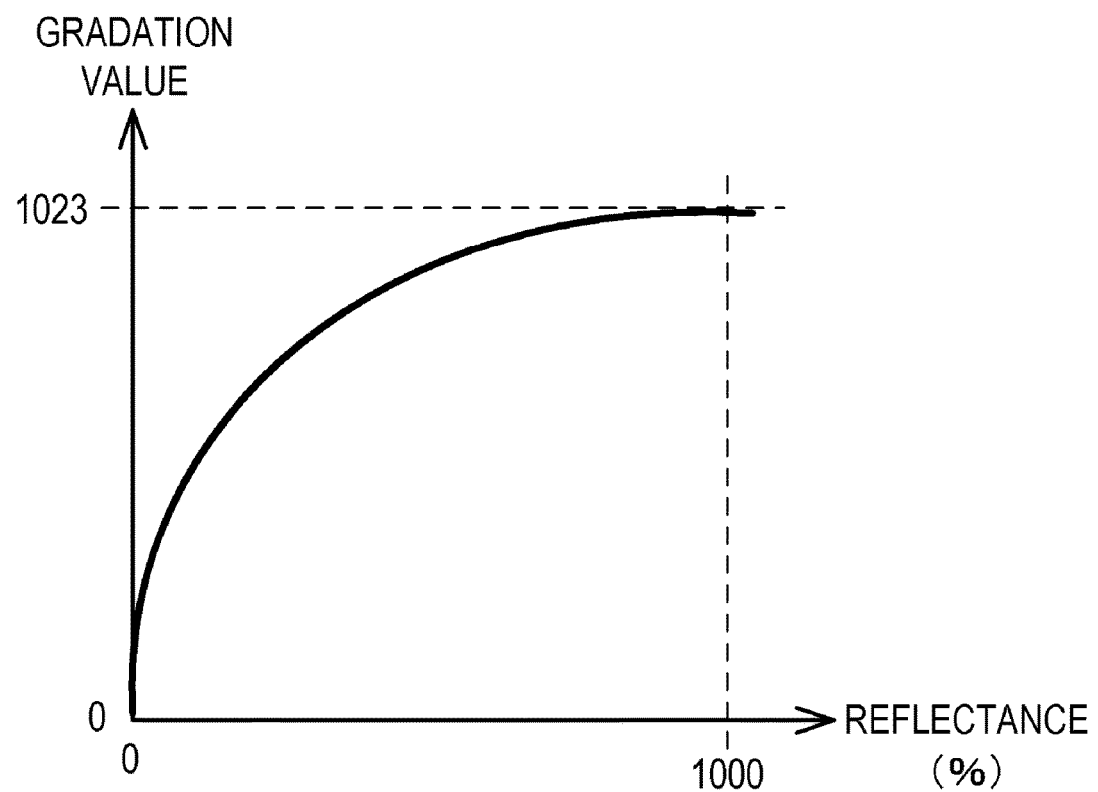
FIG. 2 is a diagram depicting an example of a gradation characteristic of input image data according to Example 1.
Figure 3:
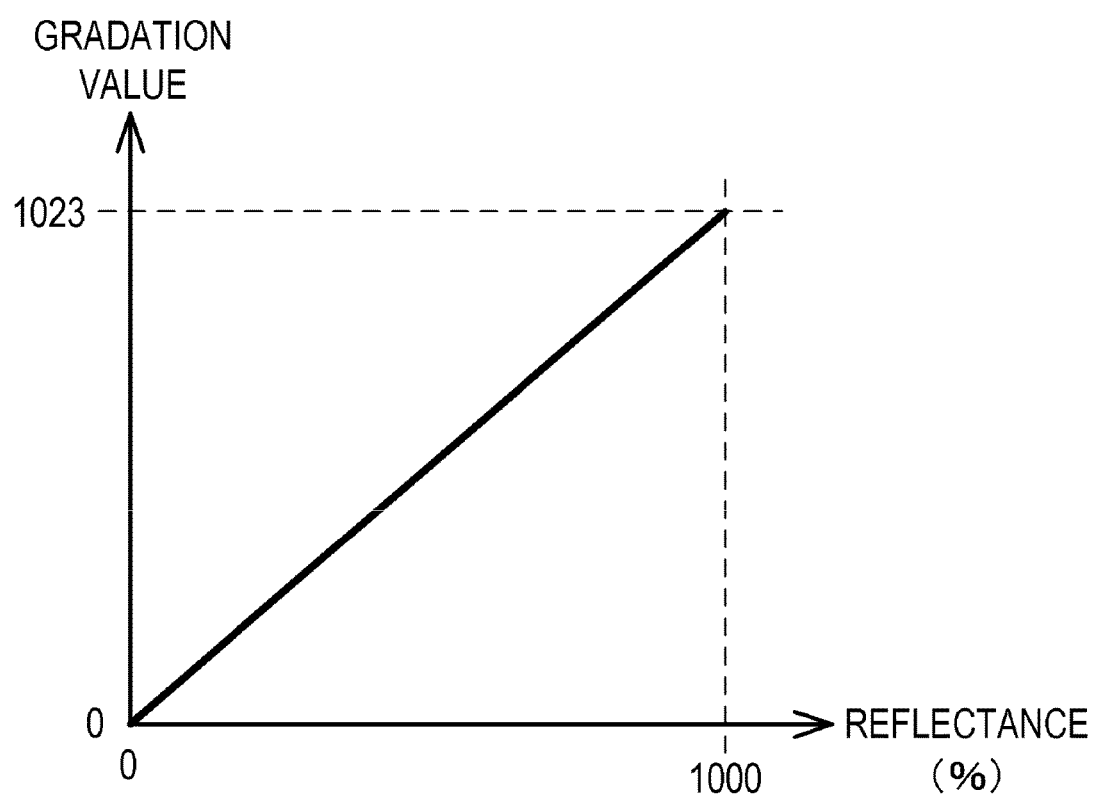
FIG. 3 is a diagram depicting an example of a gradation characteristic of linear image data according to Example 1.

In Example 1, a case when the input image data has anon-linear characteristic, where the gradation value non-linearity (logarithmically) increases with respect to the increase of the reflectance as shown in FIG. 2, will be described. The linear converting unit 105 generates linear image data by performing linear conversion processing on the input image data, to convert the gradation characteristic of the image data from the non-linear characteristic to the linear characteristic. The linear characteristic is a gradation characteristic where the gradation value linearly increases with respect to the increase of the reflectance, as shown in FIG. 3. The linear converting unit 105 outputs the generated linear image data to the range converting unit 106. The linear conversion processing is performed to simplify subsequent processing, and may be omitted.

The range converting unit 106 generates processed image data by performing the range conversion processing on the linear image data. The range converting unit 106 also generates display image data by performing image gamma conversion processing on the processed image data considering the gamma characteristic of the display unit 102. For example, if the gamma characteristic of the display unit 102 is gamma value=2.2, then the range converting unit 106 performs gamma conversion processing by raising the gradation value of the processed image data to the (1/2.2)th power. The gamma conversion processing may be omitted. For example, if the gamma characteristic of the display unit 102 is the gamma value=1, the gamma conversion processing may be omitted.

Figure 4A:
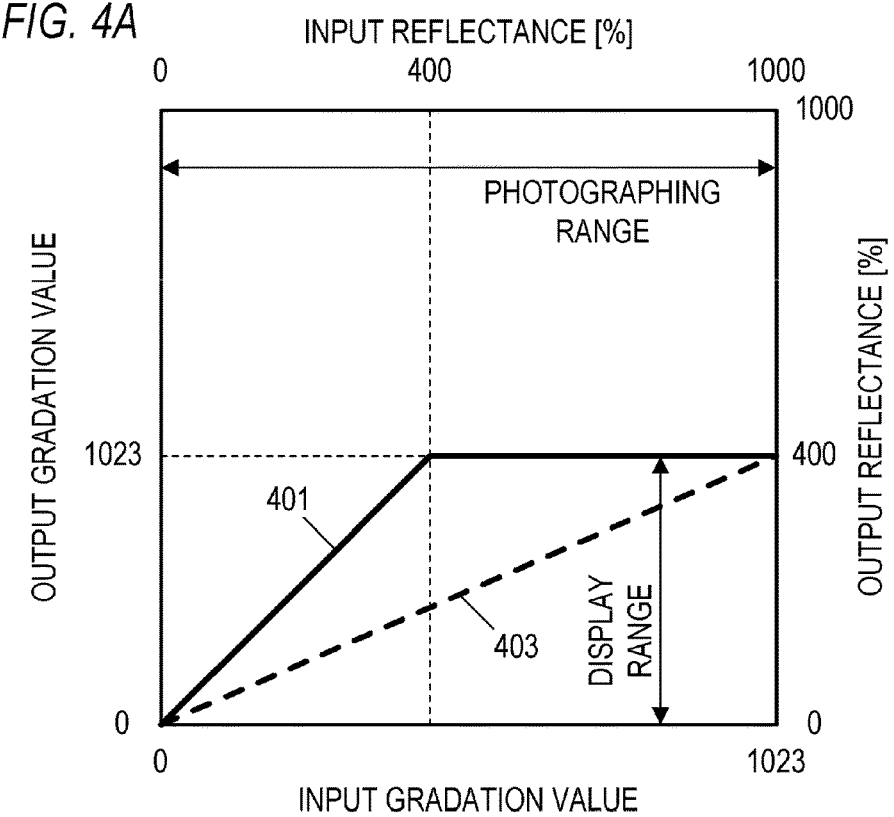
FIG. 4A and FIG. 4B are diagrams depicting an example of a range conversion processing according to Example 1.
Figure 4B:
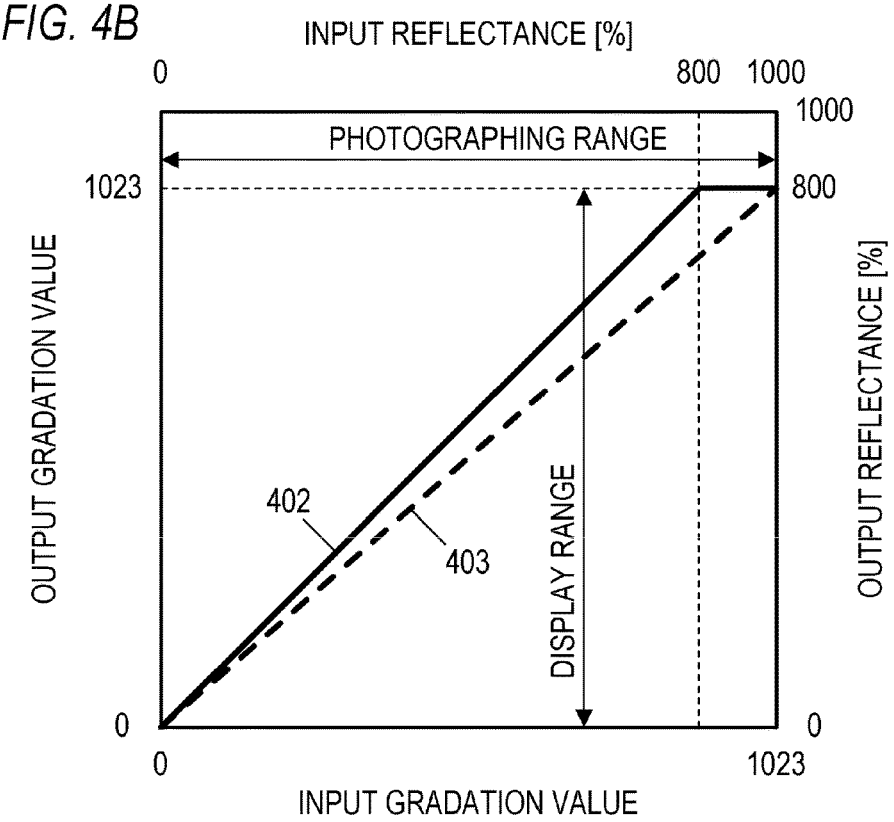

An example of the range conversion processing according to Example 1 will be described with reference to FIG. 4A and FIG. 4B. FIG. 4A and FIG. 4B are examples of the correspondence of the gradation value of linear image data (input gradation value), reflectance of linear image data (input reflectance), gradation value of processed image data (output gradation value), and reflectance of processed image data (output reflectance). The abscissas of FIG. 4A and FIG. 4B indicate the input gradation value and the input reflectance, and the ordinates of FIG. 4A and FIG. 4B indicate the output gradation value and the output reflectance. FIG. 4A and FIG. 4B show a case when the range of the input gradation value is 0 to 1023, the range of the input reflectance (photographing range) is 0 to 1000%, and the range of the output gradation value is 0 to 1023. FIG. 4A shows a case when the range of the output reflectance (display range) is 0 to 400%, and FIG. 4B shows a case when the range of the output reflectance is 0 to 800%.

In FIG. 4A and FIG. 4B, the broken line 403 indicates the range conversion processing, to simplify narrow the dynamic range of the image data from the photographing range to the display range (comparative range). In concrete terms, the broken line 403 indicates the range conversion processing to acquire a value the same as the input gradation value as the output gradation value. As the broken line 403 indicates, the output reflectance is lower than the input reflectance through the range of the output gradation values, and the gradation characteristic of the processed image data is considerably different from the gradation characteristic of the input image data. Therefore if the range conversion processing indicated by the broken line 403 is performed, the brightness of the entire display image (image displayed on the screen) drops, and visibility of the display image deteriorates.

In FIG. 4A and FIG. 4B, the sold lines 401 and 402 indicate the range conversion processing according to Example 1. According to Example 1, the output gradation value Lout is calculated using the following Expression 1. In Expression 1, "D1" denotes the maximum reflectance of the photographing range (1000%), "D2" denotes the maximum reflectance of the display range (400%), and "Lin" denotes the input gradation value. If an output gradation value Lout greater than 1023 (maximum value of the gradation values that can be used as the output gradation value) is calculated by Expression 1, 1023 is set as the output gradation value Lout. In other words, an output gradation value Lout greater than 1023 is clipped (limited) to 1023.

$$L\text{out}=(D1/D2)\times L\text{in} \quad\quad\quad\quad (\text{Expression 1})$$

As a result, as shown in FIG. 4A and FIG. 4B, for a pixel of which brightness-related value of the linear image data is within the display range, a value the same as this brightness-related value is acquired as the brightness-related value of the processed image data. In other words, for a pixel of which input reflectance has a value within the display range, a value the same as this input reflectance is acquired as the output reflectance. For a pixel of which input reflectance has a value outside the display range, a value the same as the maximum value of the reflectance within the display range (400%) is acquired as the output reflectance. Thereby a change of the gradation characteristic and deterioration of the image quality are suppressed, and a display image having high visibility can be acquired. In concrete terms, in an image region of which input reflectance has a value within the display range, a display image having a gradation characteristic, image quality and brightness equivalent to that of the input image data can be acquired. This effect cannot be implemented in an image region of which input reflectance has a value outside the display range, but it is an image region of which input reflectance has a value within the display range that the user wants to confirm. Therefore there is no problem even if the above mentioned effect is not implemented in the image region of which input reflectance has a value outside the display range.

Each gradation value of the linear image data may or may not be changed by the computation using Expression 1. For example, a look up table (LUT) indicating the correspondence between the input gradation value and the output gradation value may be generated in advance using Expression 1. Then by using the LUT, each gradation value of the linear image data can be changed. In concrete terms, the output gradation value corresponding to the gradation value of the linear image data (input gradation value) is acquired from the LUT, and each gradation value of the linear image data is changed to the acquired value (the acquired output gradation value).

As described above, according to Example 1, a characteristic closer to the gradation characteristic of the input image is acquired as the gradation characteristic of the processed image data (display image data) in the display range, compared with the range outside the display range, within the range of the input reflectance, because of the range conversion processing. Thereby the change of the gradation characteristic and the deterioration of the image quality are suppressed, and a display image having high visibility can be acquired.

The calculation formula of the output gradation value Lout is not limited to Expression 1. Expression 1 appropriately changes depending on the gradation characteristic of the image data before the range conversion processing, the gradation characteristic of the image data after the range conversion processing, the range of the input gradation value, the range of the output gradation value and the like.

Figure 5:
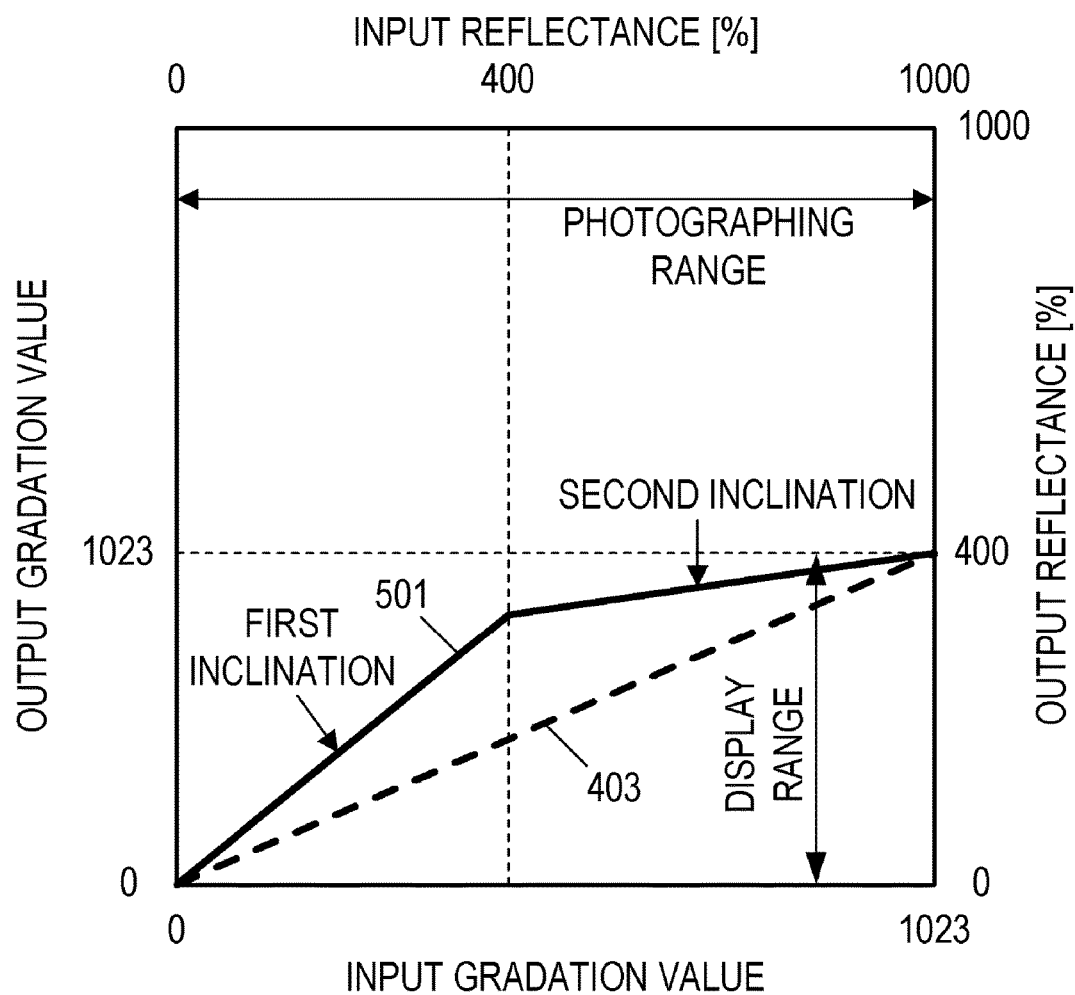
FIG. 5 is a diagram depicting an example of a range conversion processing according to Example 1.

The correspondence of the input gradation value, the input reflectance, the output gradation value, and the output reflectance is not limited to the correspondences shown in FIG. 4A and FIG. 4B (solid lines 401 and 402). For example, as indicated by the solid line 501 in FIG. 5, the output gradation value may be determined for a pixel of which input reflectance has a value within the display range, so that the output reflectance increases at a first inclination with respect to the increase of the input reflectance. Further, the output gradation value may be determined for a pixel of which input reflectance has a value outside the display range, so that the output reflectance increases at a second inclination (<first inclination) with respect to the increase of the input reflectance. Thereby, not only the above mentioned effect is implemented, but also clipping of the output gradation values can be suppressed. As a result, change of the gradation characteristic, deterioration of the image quality, and drop in visibility can be suppressed to a certain degree, even in an image region of which input reflectance has a value outside the display range.

Example 2

An image display apparatus according to Example 2 of the present invention and a control method thereof will be described. When the brightness-related value is not brightness itself, a display image having a brightness slightly different from that of the object may be acquired. For example, when the brightness-related value is reflectance, a display image having a brightness slightly different from the brightness of the object is acquired. In Example 2, a configuration by which a di splay image having brightness closer to the brightness of the object can be acquired will be described.

Figure 6:
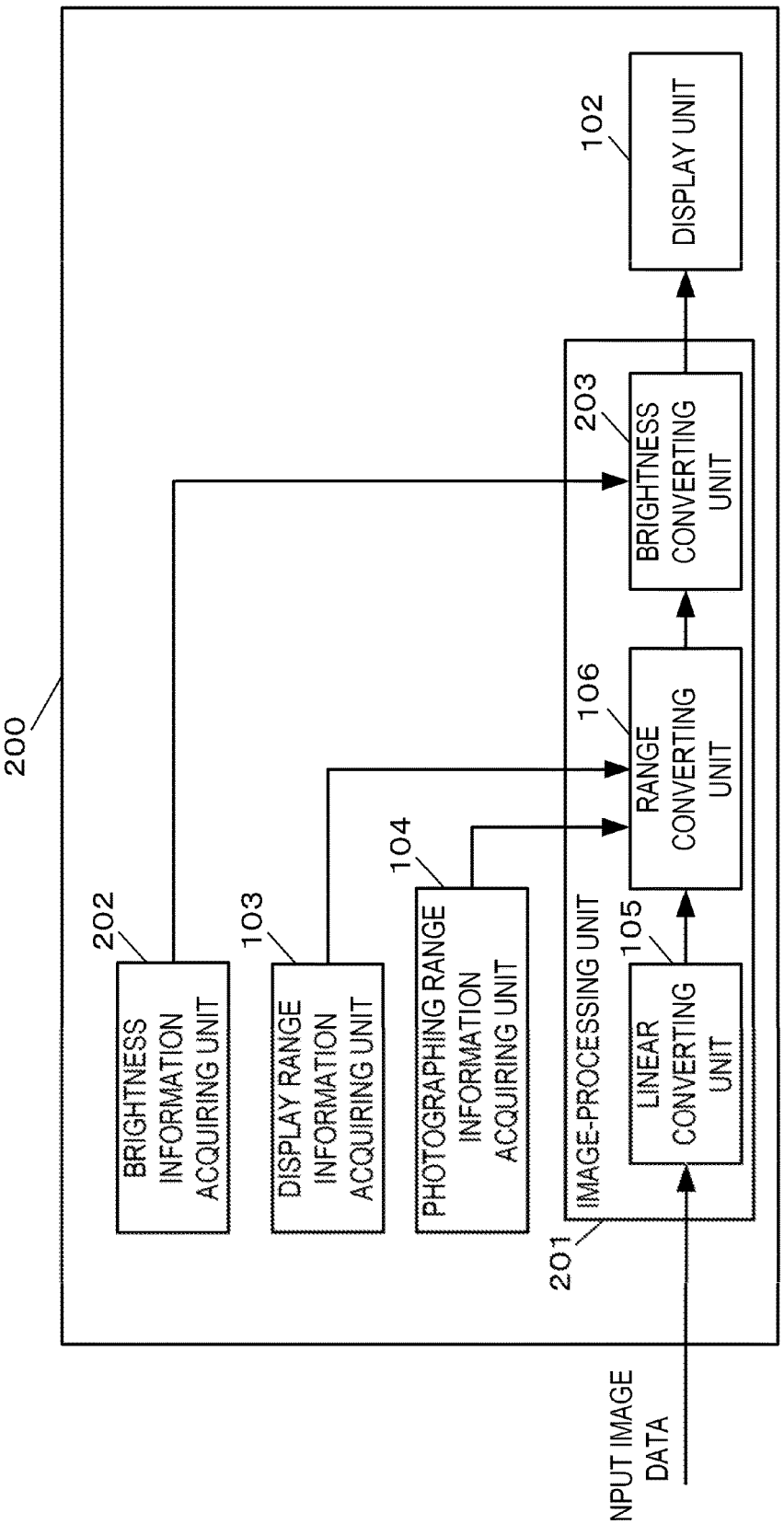
FIG. 6 is a block diagram depicting an example of a configuration of an image display apparatus according to Example 2.

FIG. 6 is a block diagram depicting an example of a configuration of the image display apparatus 200 according to Example 2. As shown in FIG. 6, the image display apparatus 200 includes an image-processing unit 201, a brightness information acquiring unit 202, a display unit 102, a display range information acquiring unit 103, and a photographing range information acquiring unit 104. The image-processing unit 201 includes a linear converting unit 105, a range converting unit 106, and a brightness converting unit 203. The functions of the display unit 102, the display range information acquiring unit 103, the photographing range information acquiring unit 104, the linear converting unit 105, and the range converting unit 106 are the same as those of Example 1, hence description thereof is omitted.

The brightness information acquiring unit 202 acquires brightness information representing the correspondence between the reflectance (brightness-related value) and the brightness of the object (third acquiring processing). For example, the brightness information is table data representing the correspondence between the reflectance and the brightness, as shown in FIG. 7. The brightness information acquiring unit 202 outputs the acquired brightness information to the brightness converting unit 203.

The method for acquiring the brightness information is not especially limited. The image display apparatus 200 may store the brightness information in advance. If the input image data is photographed image data, the imaging apparatus normally stores the brightness information. Therefore in this case, the brightness information acquiring unit 202 can acquire the brightness information from the imaging apparatus. Further, in some cases, brightness information is included in the input image data. For example, in some cases, brightness information is included in the metadata of the input image data. In this case, the brightness information acquiring unit 202 can acquire (extract) the brightness information from the input image data.

The brightness information is not limited to the table data shown in FIG. 7. For example, the brightness information may be a function representing the correspondence between the reflectance and brightness. The brightness information may be information representing only the brightness corresponding to one or more specific reflectances. If the brightness information represents a plurality of brightness values corresponding to a plurality of specific reflectances, a brightness value corresponding to a reflectance other than a specific reflectance can be estimated by interpolation (or extrapolation) using a plurality of brightness values corresponding to a specific reflectance. If the brightness information represents one brightness value corresponding to one specific reflectance, a brightness value corresponding to a reflectance other than the specific reflectance and a reference reflectance can be estimated by interpolation using a brightness value corresponding to the specific reflectance and the reference brightness corresponding to the reference reflectance. For example, the reference reflectance is 0%, and the reference brightness is 0 cd/m$^2$.

The brightness converting unit 203 acquires the brightness information from the brightness information acquiring unit 202, and acquires the processed image data (first processed image data) from the range converting unit 106. The brightness converting unit 203 generates display image data (second processed image data) by performing the brightness conversion processing (second image processing) on the first processed image data based on the brightness information (second processing). The brightness conversion processing is processing to change each gradation value of the first processed image data. In Example 2, by the brightness conversion processing, the display brightness (brightness on the screen) is made closer to the brightness corresponding to the input reflectance for the display image, within the range of the input reflectance. The brightness conversion processing is gain processing, in which each gradation value of the first processed image data is multiplied by the gain value. When necessary, the gamma conversion processing described in Example 1 is executed by the range converting unit 106 or the brightness converting unit 203.

Figure 8:
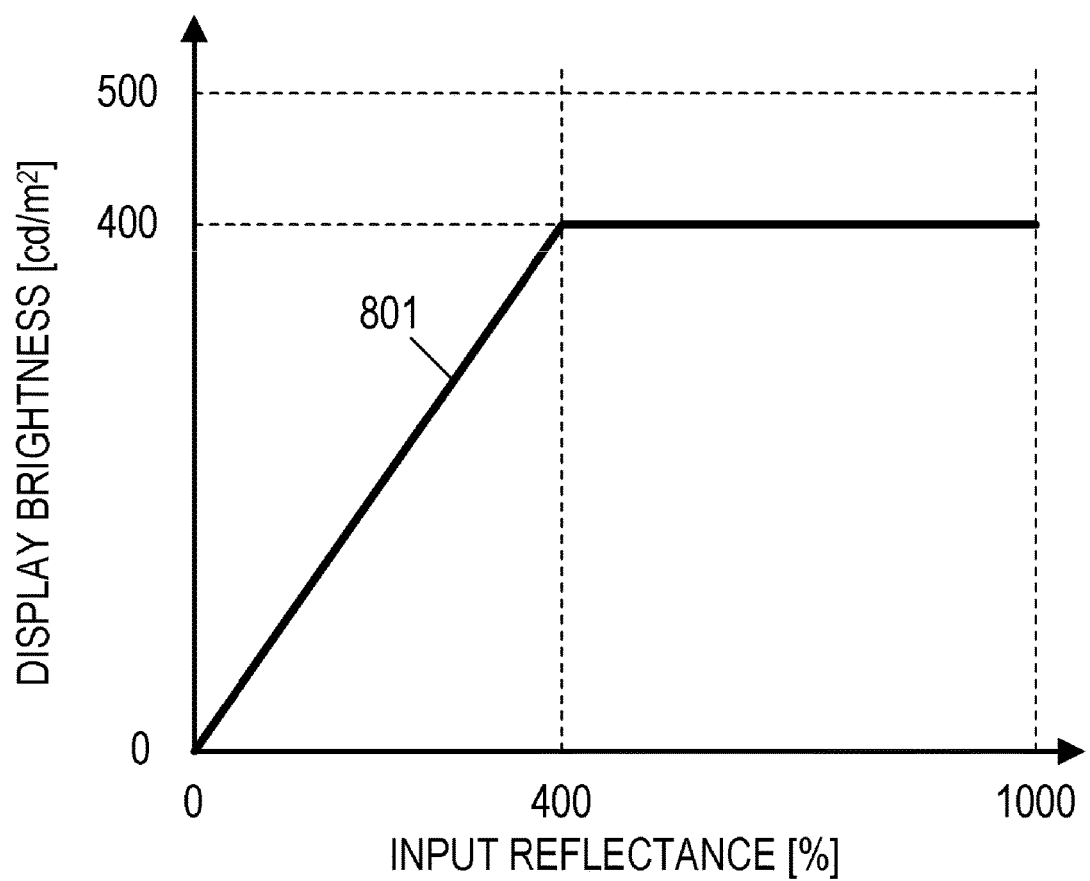
FIG. 8 is a diagram depicting a brightness conversion processing according to Example 2.

An example of the brightness conversion processing according to Example 2 will be described in detail with reference to FIG. 8. FIG. 8 shows an example of the correspondence between the input reflectance and the display brightness. The abscissa in FIG. 8 indicates the input reflectance, and the ordinate in FIG. 8 indicates the display brightness. FIG. 8 shows a case when the range of the input reflectance (photographing range) is 0 to 1000%, and the range of the output reflectance (display range) is 0 to 400%.

In FIG. 8, the solid line 801 indicates the brightness conversion processing according to Example 2. In Example 2, the gradation value of the first processed image data is changed so that a pixel of which brightness-related value of the input image data is within the second range is displayed at a brightness the same as the brightness corresponding to this brightness-related value, as indicated by the solid line 801. In other words, the gradation value of the first processed image data is changed so that a pixel of which input reflectance has a value within the display range is displayed at a brightness the same as the brightness corresponding to this input reflectance. The gradation value of the first processed image data is also changed so that a pixel of which input reflectance has a value outside the display range is displayed at a brightness the same as the brightness corresponding to the maximum value (400%) of the reflectances within the display range. Thereby a display image of which brightness is closer to the brightness of the object can be acquired. In concrete terms, a display brightness closer to the brightness of the object can be acquired in an image region of which input reflectance has a value within the display range.

As described above, according to Example 2, by the brightness conversion processing, a display brightness (brightness on the screen) can be made closer to the brightness corresponding to the input reflectance in the display range, within the range of the input reflectance. Thereby a display image of which brightness is closer to the brightness of the object can be acquired.

Figure 9:
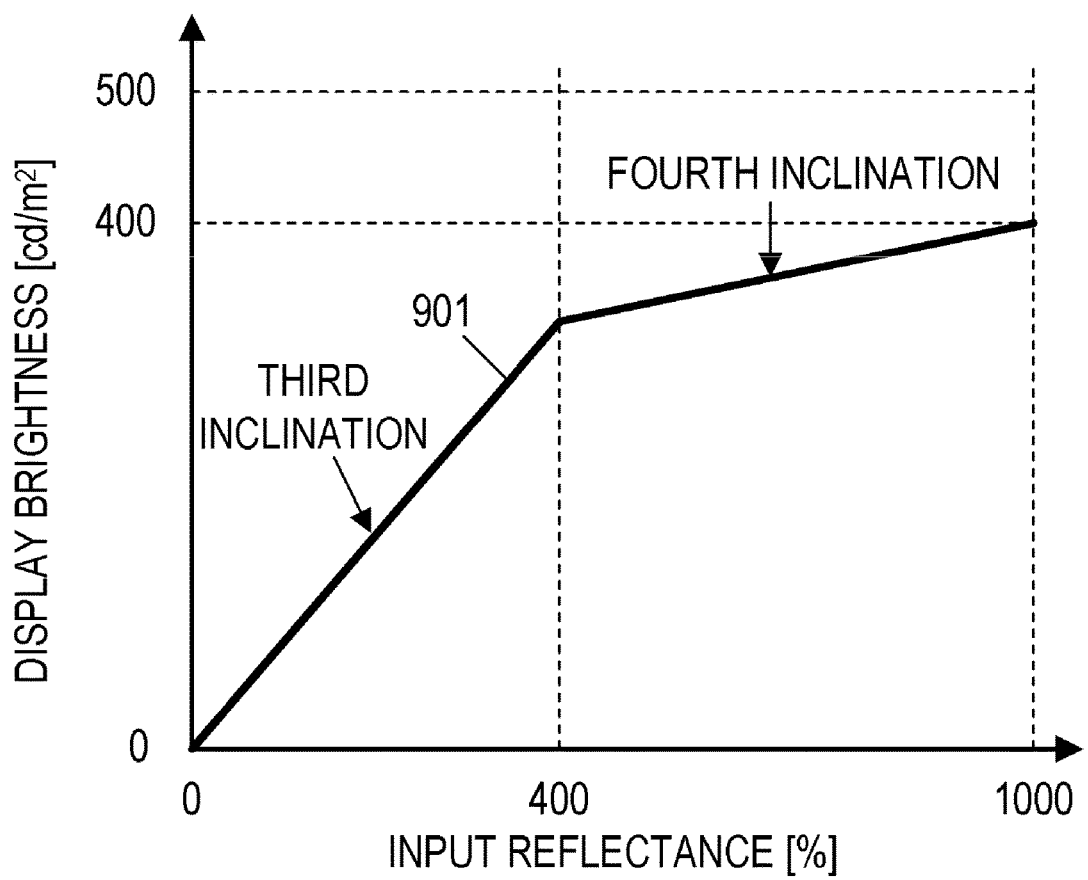
FIG. 9 is a diagram depicting a brightness conversion processing according to Example 2.

The correspondence between the input reflectance and the display brightness is not limited to the correspondence shown in FIG. 8 (solid line 801). For example, as indicated by the solid line 901 in FIG. 9, the gradation value of the first processed image data may be changed so that the display brightness of the pixel of which input reflectance has a value within the display range increases at a third inclination with respect to the increase of the input reflectance. The gradation value of the first processed image data may also be changed so that the display brightness of the pixel of which input reflectance has a value outside the display range increases at a fourth inclination (<third inclination) with respect to the increase of the input reflectance. Thereby not only is the abovementioned effect implemented, but also clipping of the display brightness can be suppressed. As a result, even in an image region of which input reflectance has a value outside the display range, the display brightness can be made closer to the brightness of the object to a certain degree.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-053524, filed on Mar. 17, 2015, which is hereby incorporated by reference herein in its entirety.

What is claimed is:

1. An image display apparatus comprising:
   a first acquiring unit configured to acquire, based on a set input mode out of a plurality of input modes each of which is settable as an operation mode of the image display apparatus, first information relating to a first range, which is a range of brightness-related values of input image data corresponding to the set input mode;
   a second acquiring unit configured to acquire second information relating to a second range, which is a range of brightness-related values of an image displayed by the image display apparatus, and, is a range narrower than the first range;
   a first processing unit configured to generate first processed image data by performing first image processing to change a gradation value of the input image data, based on the first information and the second information; and
   a display unit configured to display an image based on the first processed image data, wherein
   the first processing unit changes a gradation value of the input image data, so that a gradation characteristic of the first processed image data generated by performing the first image processing on the input image data within the second range becomes a characteristic closer to a gradation characteristic of the input image data, compared with a gradation characteristic of first processed image data generated by performing the first image processing on the input image data in a range outside the second range.

2. The image display apparatus according to claim 1, wherein
   the second range is a maximum range of the brightness-related values of the image displayed by the image display apparatus.

3. The image display apparatus according to claim 1, wherein
   the second information is information corresponding to a set display mode out of a plurality of display modes each of which is settable as an operation mode of the image display apparatus.

4. The image display apparatus according to claim 1, wherein
   the first processing unit changes a gradation value of the input image data so that
   for a pixel of which brightness-related value of the input image data is within the second range, a value the same as this brightness-related value is acquired as the brightness-related value of the first processed image data, and
   for a pixel of which brightness-related value of the input image data is outside the second range, a value the same as a maximum value of the brightness-related values within the second range is acquired as the brightness-related value of the first processed image data.

5. The image display apparatus according to claim 1, wherein the brightness-related value is a reflectance when light is reflected by an object.

6. The image display apparatus according to claim 1, further comprising a converting unit configured to perform conversion processing to convert a gradation characteristic of the input image data from a non-linear characteristic to a linear characteristic, wherein
   the first processing unit changes a gradation value of converted image data which is image data after the conversion processing, so that a gradation characteristic of the first processed image data generated by performing the first image processing on the converted image data in the second range becomes a characteristic closer to a gradation, characteristic of the converted image data, compared with a gradation characteristic of the first processed image data generated by performing the first image processing on the converted image data in a range outside the second range.

7. The image display apparatus according to claim 5, further comprising:

a third acquiring unit configured to, acquire brightness information relating to a correspondence between the brightness-related values and a brightness; and a second processing unit configured to generate second processed image data by performing second image processing based on the brightness information on the first processed image data, wherein the second processing unit changes a gradation value of the first processed image data, so that a brightness of the image displayed by the image display apparatus becomes closer to a brightness corresponding to the brightness-related value of the input image data in the second range, and the display unit displays an image based on the second processed image data.

8. The image display apparatus according to claim 7, wherein the second processing unit changes a gradation value of the first processed image data so that a pixel, of which brightness-related value of the input image data is within the second range, is displayed at a brightness the same as a brightness corresponding to this brightness-related value, and a pixel, of which brightness-related value of the input image data is outside the second range, is displayed at a brightness the same as a brightness corresponding to a maximum value the brightness-related values within the second range.

9. The image display apparatus according to claim 7, wherein the input image data is image data acquired by photographing using an imaging apparatus, and the third acquiring unit acquires the brightness information from the imaging apparatus.

10. The image display apparatus according to claim 7, wherein the brightness information is metadata, of the input image data, and the third acquiring unit acquires the brightness information from the input image data.

11. A control method of an image display apparatus, comprising:

a first acquiring step of acquiring, based on a set input mode out of a plurality of input modes each of which is settable as an operation mode of the image display apparatus, first information relating to a first range, which is a range of brightness-related values of input image data corresponding to the set input mode;

a second acquiring step of acquiring second information relating to a second range, which is a range of brightness-related values of an image displayed by the image display apparatus, and is a range narrower than the first range;

a processing step of generating processed image data by performing image processing to change a gradation value of the input image data, based on the first information and the second information; and a display step of displaying an image based on the processed image data, wherein in the processing step, a gradation value of the input image data is changed, so that a gradation characteristic of the first processed data generated by performing the first image processing on the input image data within the second range becomes a characteristic closer to a gradation characteristic of the input image data, compared with a gradation characteristic of the first processed image data generated by performing the first image processing on the input image data in a range outside the second range.

12. The image display apparatus according to claim 1, further comprising a storage unit configured to a plurality of first information corresponding to the plurality of input modes.

13. The image display apparatus according to claim 1, wherein the input image data is HDR image data.

14. The image display apparatus according to claim 1, wherein a range of gradation values of the first processed image data is equal to a range of gradation values of the input image data.

* * * * *